United States Patent [19]
Tassone et al.

[11] Patent Number: 5,558,464
[45] Date of Patent: *Sep. 24, 1996

[54] SYSTEM FOR CONVEYING A FLUID THROUGH AN UNDER-THE-GROUND LOCATION AND METHOD OF MAKING THE SAME

[75] Inventors: Joseph V. Tassone, Kettering, Ohio; Richard L. Marsh, Springfield, Mo.; James T. Candor, Washington Township, Ohio

[73] Assignee: Dayco Products, Inc., Dayton, Ohio

[*] Notice: The term of this patent shall not extend beyond the expiration date of Pat. No. 5,358,358.

[21] Appl. No.: 445,445

[22] Filed: May 19, 1995

Related U.S. Application Data

[62] Division of Ser. No. 284,029, Aug. 1, 1994, which is a division of Ser. No. 18,687, Feb. 17, 1993, Pat. No. 5,358,358.

[51] Int. Cl.⁶ .................................................. F16L 11/11
[52] U.S. Cl. ..................... 405/154; 138/111; 138/113; 138/173
[58] Field of Search .................................... 138/108, 110, 138/111, 112, 113, 172, 173, 177; 141/44, 45, 59; 285/133.1; 405/52, 132, 150.1, 154, 184

[56] References Cited

U.S. PATENT DOCUMENTS

| 2,983,506 | 5/1961 | Bertsch et al. | 285/133.1 X |
|---|---|---|---|
| 3,753,287 | 8/1973 | Ziemek et al. | 285/133.1 X |
| 3,974,862 | 8/1976 | Fuhrmann | 138/103 X |
| 4,009,739 | 3/1977 | Weatherford | 141/59 |
| 4,261,671 | 4/1981 | Langner | 138/173 X |
| 4,312,383 | 1/1982 | Kleykamp | 138/103 |
| 4,487,232 | 12/1984 | Kanao | 138/173 X |
| 4,922,971 | 5/1990 | Grantham | 285/173 X |
| 4,951,720 | 8/1990 | Grantham | 141/44 |
| 4,971,477 | 11/1990 | Webb et al. | 405/144 |
| 5,060,696 | 10/1991 | Putter | 405/150.1 X |
| 5,089,074 | 2/1992 | Winter et al. | 156/244.13 |
| 5,102,012 | 4/1992 | Foster | 222/40 |
| 5,129,686 | 7/1992 | Sanders et al. | 285/258 |
| 5,143,122 | 9/1992 | Adkins | 138/103 X |
| 5,152,635 | 10/1992 | Ziu | 405/52 |
| 5,358,358 | 10/1994 | Tassone et al. | 405/154 |

OTHER PUBLICATIONS

Pamphlet A115, Advanced Polmer Technology, Inc., Elkhart, Indiana Mar. 1992.

Primary Examiner—John A. Ricci
Attorney, Agent, or Firm—Joseph V. Tassone

[57] ABSTRACT

A system for conveying a fluid through an under-the-ground location and method of making the same are provided, the system comprising a primary flexible conduit for conveying the fluid therethrough and having an outer peripheral surface and an inner peripheral surface, and an outer secondary conduit having at least a portion of the primary conduit removably disposed therein and having an inner peripheral surface and an outer peripheral surface that engages the ground in the under-the-ground location thereof, the secondary conduit having the inner peripheral surface thereof comprising a helically disposed and inwardly directed projection thereof that engages the outer peripheral surface of the primary conduit in a spiral manner and cooperates therewith to define a helically disposed passage that extends therebetween throughout substantially the entire engagement area thereof.

16 Claims, 4 Drawing Sheets

SYSTEM FOR CONVEYING A FLUID THROUGH AN UNDER-THE-GROUND LOCATION AND METHOD OF MAKING THE SAME

CROSS REFERENCE TO RELATED APPLICATIONS

This application is a divisional patent application of its parent patent application, Ser. No. 284,029, filed Aug. 1, 1994, which, in turn, is a divisional patent application of its parent patent application, Ser. No. 018,687, filed Feb. 17, 1993, now U.S. Pat. No. 5,358,358.

BACKGROUND OF THE INVENTION

1. Field of the Invention

This invention relates to a new system for conveying a fluid through an under-the-ground location and method of making such a system.

2. Prior Art Statement

It is known to provide a system for conveying a fluid through an under-the-ground location, the system comprising a primary flexible conduit means for conveying the fluid therethrough and having an inner peripheral surface means and an outer peripheral surface means, and an outer secondary conduit means having at least a portion of the primary conduit means removably disposed therein and having an inner peripheral surface means and an outer peripheral surface means that engages the ground in the under-the-ground location thereof. For example, see the U.S. patent to Webb et al, U.S. Pat. No. 4,971,477.

It is also known to provide a primary conduit means that has a helically disposed passage formed therein throughout the length thereof (see the U.S. patent to Winter et al, U.S. Pat. No. 5,089,074) with coupling means for coupling each end of the primary conduit means to other fluid conveying structure (see the U.S. patent to Sanders et al, U.S. Pat. No. 5,129,686) and to either bury that primary conduit means directly into the ground or dispose the same within a secondary conduit means that is buried in the ground (see the U.S. patent to Foster, U.S. Pat. No. 5,102,012).

It is also known to provide a flexible hose having its inner peripheral surface means defined by a projection means that is helically disposed throughout the length thereof and having a fluid conveying conduit means disposed therein. For example, see the U.S. patent to Grantham, U.S. Pat. No. 4,951,720.

It is also known to provide a plurality of uniformly spaced apart radially disposed ribs on the inner peripheral surface means of a secondary conduit means so that at least some of the ribs will engage the outer peripheral surface means of the primary conduit means in the under-the-ground location thereof. The inner edges of the ribs on the secondary conduit means define an internal diameter that is substantially larger than the external diameter defined by the external peripheral surface means of the primary conduit means when the primary conduit means is disposed in the secondary conduit means before the combination thereof is disposed in the ground. For example, see the March, 1992 Form A 115 pamphlet of Advanced Polymer Technology, Inc. of Elkhart, Ind.

SUMMARY OF THE INVENTION

It is one of the features of this invention to provide a new system for conveying a fluid in an under-the-ground location by utilizing a unique combination of a primary conduit means and a surrounding secondary conduit means to create a helically disposed passage that extends therebetween.

In particular, it is believed according to the teachings of this invention that the inner peripheral surface means of the secondary conduit means can comprise a helically disposed and inwardly directed projection thereof that engages the outer peripheral surface means of the primary conduit means in a spiral manner and cooperates therewith to define a helically disposed passage that extends therebetween throughout substantially the entire engagement area thereof.

It is also believed that such engagement of the projection of the secondary conduit means with the outer peripheral surface means of the primary conduit means not only provides reinforcement means for the primary conduit means so that the same can effectively convey a fluid therethrough in an under-the-ground location thereof or the like, but also the resulting helically disposed passage can be utilized for leak detection purposes, such as for detecting for leakage of the fluid from the primary conduit means through the outer peripheral surface means thereof.

For example, one embodiment of this invention comprises a system for conveying a fluid through an under-the-ground location, the system comprising a primary flexible conduit means for conveying the fluid therethrough and having an inner peripheral surface means and an outer peripheral surface means, and an outer secondary conduit means having at least a portion of the primary conduit means removably disposed therein and having an inner peripheral surface means and an outer peripheral surface means that engages the ground in the under-the-ground location thereof, the secondary conduit means having the inner peripheral surface means thereof comprising a helically disposed and inwardly directed projection thereof that engages the outer peripheral surface means of the primary conduit means in a spiral manner and cooperates therewith to define a helically disposed passage that extends therebetween throughout substantially the entire engagement area thereof.

Accordingly, it is an object of this invention to provide a new system for conveying a fluid through an under-the-ground location, the system of this invention having one or more of the novel features of this invention as set forth above or hereinafter shown or described.

Another object of this invention is to provide a new method of making such a system, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

DESCRIPTION OF THE PREFERRED EMBODIMENT

Figure 1:
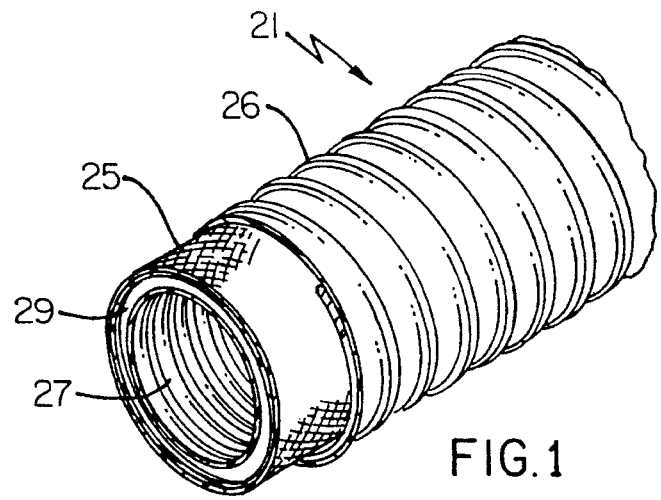
FIG. 1 is a fragmentary perspective view of the assembled together conduit means of this invention that is utilized in the system of this invention.

While the various features of this invention are hereinafter illustrated and described as being particularly adapted to provide a system for conveying a volatile liquid, such as gasoline, through an under-the-ground location, it is to be understood that the various features of this invention can be utilized singly or in various combinations thereof to provide a system for conveying other types of fluids through an under-the-ground location or the like as desired.

Therefore, this invention is not to be limited to only the embodiments illustrated in the drawings, because the drawings are merely utilized to illustrate one of the wide variety of uses of this invention.

Referring now to FIGS. 7–11, the new system of this invention is generally indicated by the reference numeral 20 and comprises one or more conduit arrangements of this invention that are each generally indicated by the reference numeral 21 and disposed in the ground 22 in an under-the-ground location thereof for conveying a fluid therethrough which in the embodiments illustrated in the drawings comprises gasoline being conveyed from an under-the-ground storage tank 23 to an above-the-ground dispensing pump means 24 all in the general manner that is fully set forth in the aforementioned U.S. patent to Webb et al, U.S. Pat. No. 4,971,477 and the U.S. patent to Foster, U.S. Pat. No. 5,102,012 whereby these two U.S. patents are being incorporated into this disclosure by this reference thereto.

Figure 2:
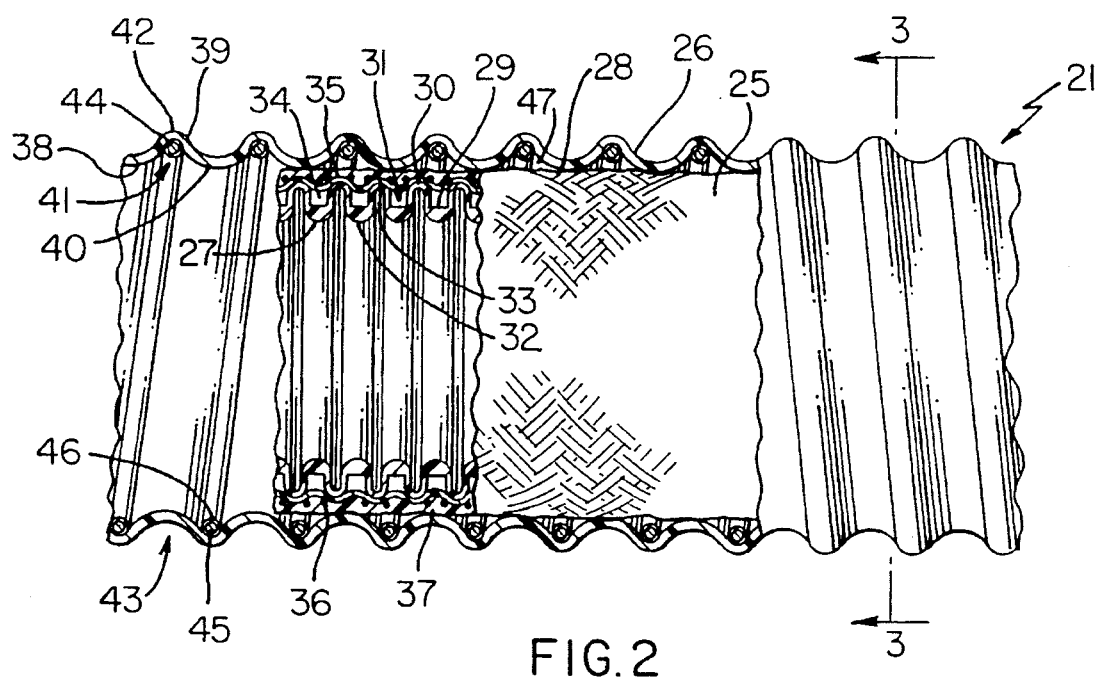
FIG. 2 is an enlarged side view of the conduit arrangement of FIG. 1 with FIG. 2 being partially in elevation, partially broken away and partially in cross section.
Figure 3:
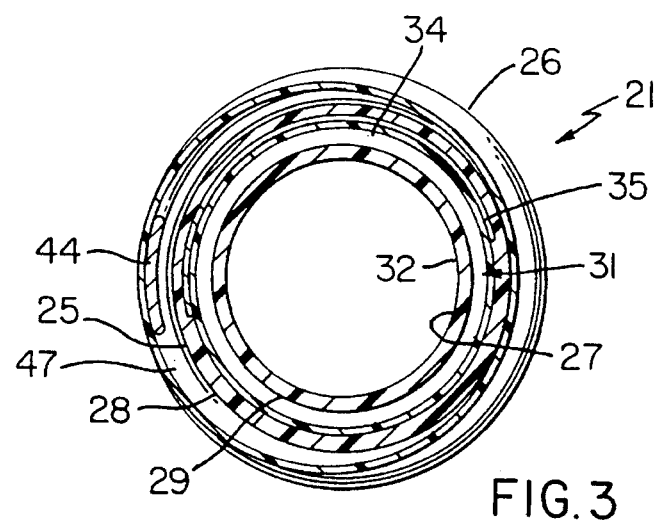
FIG. 3 is a cross-sectional view taken on line 3—3 of FIG. 2.

Each conduit arrangement 21 illustrated in FIGS. 7–11 comprises the conduit arrangement 21 illustrated in FIGS. 1–3 which comprises a primary conduit means 25 and an outer surrounding secondary conduit means 26, each conduit means 25 or 26 being formed mainly of polymeric material and being relatively flexible.

In particular, the primary conduit means 25 has an inner peripheral surface means 27 and an outer peripheral surface means 28 and comprises a structure that is fully disclosed and claimed in the aforementioned U.S. patent to Winter et al, U.S. Pat. No. 5,089,074 whereby this U.S. patent is also being incorporated into this disclosure by this reference thereto.

Therefore, it can be seen that the primary conduit means 25 comprises an inner corrugated hose 29 defined by a plurality of outwardly directed annular projections 30 having recesses 31 therebetween which define the internal peripheral surface 27 of the primary conduit means 25 as a plurality of inwardly directed annular projections 32 having recesses 33 therebetween. A tubular member 35 is disposed against the projections 30 of the inner hose 29 and cooperates therewith to define void spaces 34 therebetween for the reasons fully set forth in the aforementioned U.S. patent to Winter, et al, U.S. Pat. No. 5,089,074. A reinforcing braid 36 is disposed on the tube 35 and an outer layer 37 of polymeric material has been extruded on top of the braid 36 and exuded therethrough to bond to the tube 35 and complete the flexible primary conduit means 25 that is presently being utilized as the primary conduit means in a system similar to the system set forth in the aforementioned U.S. patent to Webb et al, U.S. Pat. No. 4,971,477, the outer layer 37 defining a relatively smooth outer peripheral surface means 28 of the primary conduit means 25.

Figure 4:
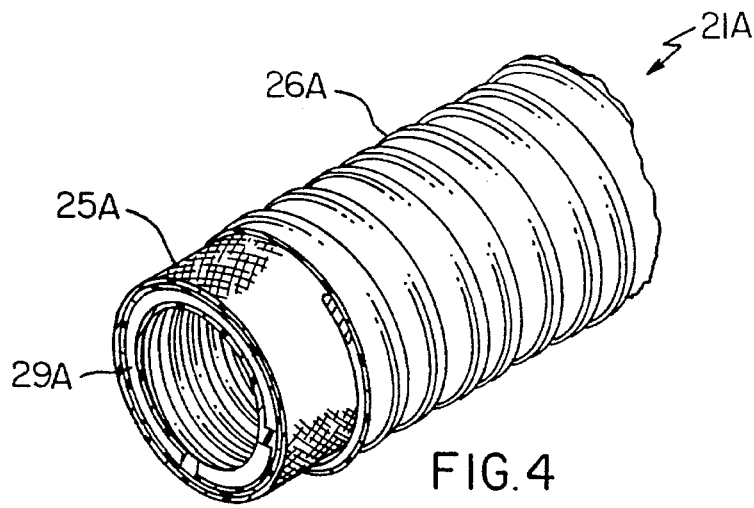
FIG. 4 is a view similar to FIG. 1 and illustrates another embodiment of the conduit arrangement of this invention.
Figure 5:
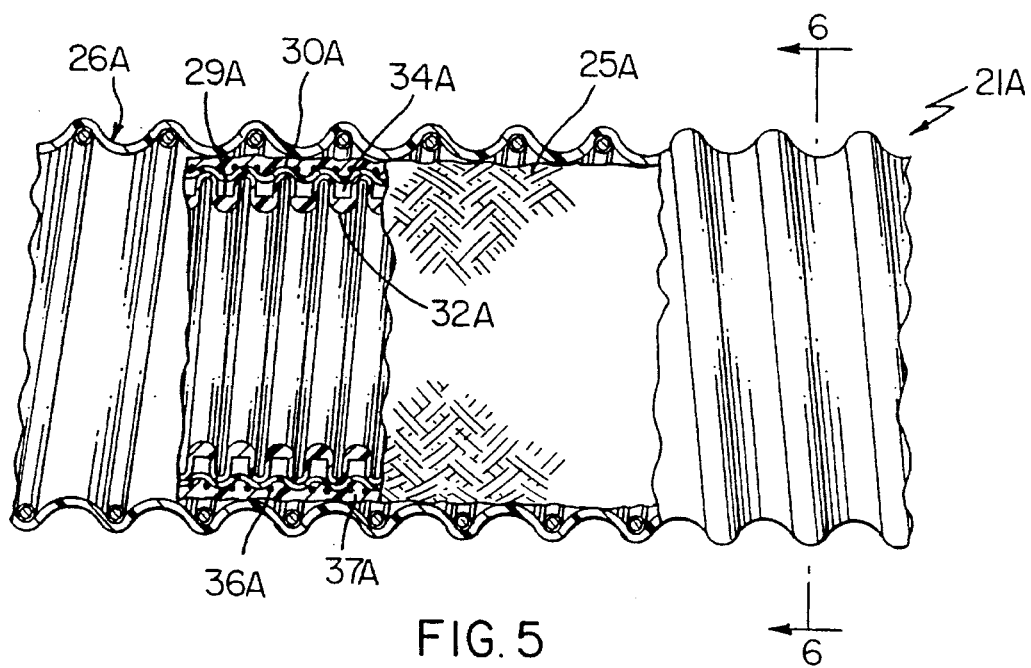
FIG. 5 is a view similar to FIG. 2 and illustrates the conduit arrangement of FIG. 4.
Figure 6:
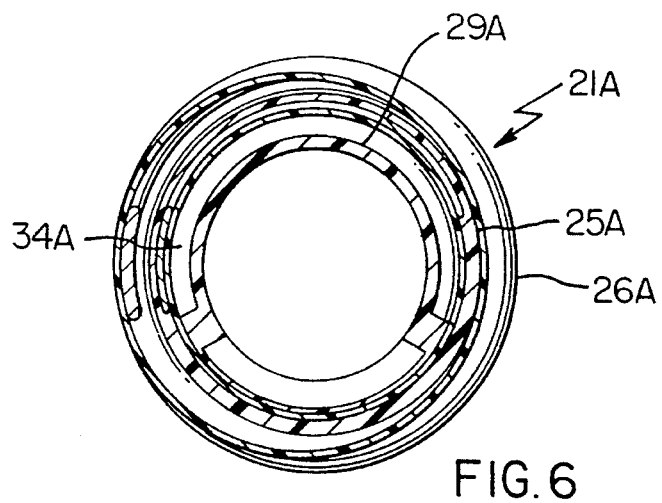
FIG. 6 is a cross-sectional view taken on line 6—6 of FIG. 5.

While the primary conduit means 25 has the inner hose 29 thereof defining annular projections 30 and 32 as previously described, it is to be understood that the projections could be helically disposed in the manner illustrated in FIGS. 4–6 wherein another conduit arrangement of this invention is generally indicated by the reference numeral 21A and parts thereof similar to the parts of the conduit arrangement 21 previously described are indicated by like reference numerals followed by the reference letter "A".

It can be seen in FIGS. 4–6 that the conduit arrangement 21A is substantially identical to the conduit arrangement 21 previously described as well as hereinafter described, except that the inner hose 29A of the primary conduit means 25A has the outer and inner projections 30A and 32A thereof helically disposed so that the void space 34A being created in the primary hose 25A is actually a helically disposed passage that extends throughout the entire length of the primary conduit means 25A, such a helical arrangement being fully disclosed and claimed in the aforementioned U.S. patent to Winter et al, U.S. Pat. No. 5,089,074.

The outer or secondary conduit means 26 of the combination 21, as well as the secondary conduit means 26A of the combination 21A, has an internal peripheral surface means 38 and an outer peripheral surface means 39, the inner peripheral surface means 38 comprising a plurality of inwardly directed projections 40 with recesses 41 therebetween while the outer peripheral surface means 39 comprises a plurality of outwardly directed projections 42 with recesses 43 therebetween. The outwardly directed projections 42 and inwardly directed projections 40 of the secondary conduit means 26 are helically disposed throughout the length of the primary conduit means 26 and a helically disposed reinforcement member 44 is disposed in the helically disposed recess 41 as illustrated, the reinforcing means 44 comprising a metallic wire 45 covered with a polymeric material 46 which bonds to the polymeric material of the secondary conduit means 26 whereby it can be seen that the secondary conduit means 26 or 26A illustrated in the drawings is substantially identical to and is formed in substantially the same manner as the fully disclosed outer conduit means of the hose assemblies illustrated and described in the aforementioned U. S. patent to Grantham, U.S. Pat. No. 4,951,720 whereby this U.S. patent is also being incorporated into this disclosure by this reference thereto.

However, the internal diameter of the secondary conduit means 26 is so selected relative to the external diameter of the primary conduit means 25 that the inward projection means 40 of the secondary conduit means 26 engages in a spiral manner against the outer peripheral surface 28 of the primary conduit means 25, which is substantially smooth and generally straight-line continuous throughout the length thereof, to define or create a helically disposed substantially sealed passage 47 throughout substantially the entire engagement area of the secondary conduit means 26 with the primary conduit means 25, such engagement occurring either when the primary conduit means 25 and secondary conduit means 26 are assembled together in an above-the-ground arrangement thereof or only when the combination 21 thereof is disposed in the under-the-ground location thereof and the ground 22 is compacting the secondary conduit means 26 radially inwardly toward the primary conduit means 25 and/or the pressure of the fluid being conveyed through the primary conduit means 25 has radially outwardly expanded the primary conduit means 25 into contact with the projection means 40 of the secondary conduit means 26 in a manner hereinafter set forth.

In any event, it can be seen that the helically disposed passage 47 between the conduit means 25 and 26 is unique in the art and can be uniquely utilized in the under-the-ground locations of the conduit arrangements 21 in a manner hereinafter set forth.

Figure 7:
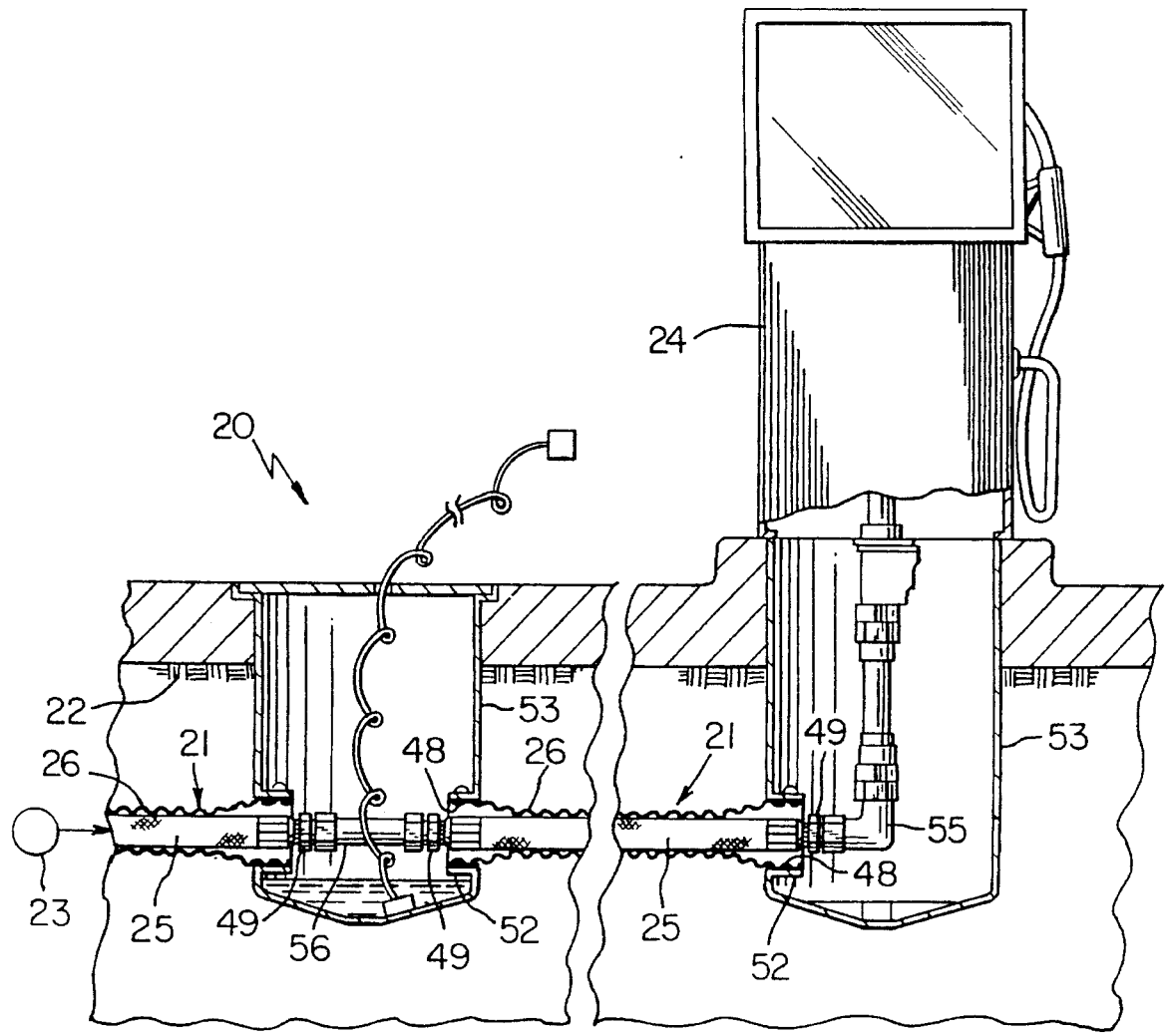
FIG. 7 is a fragmentary schematic view that is partially in elevation and partially in cross section and that illustrates the new system of this invention for conveying a fluid through an under-the-ground location.
Figure 9:
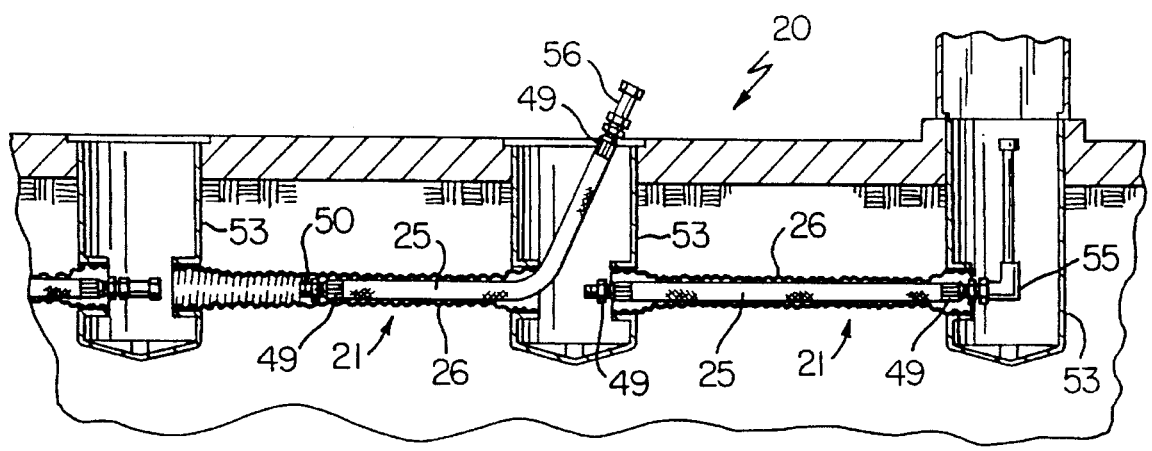
FIG. 9 is a reduced schematic view similar to FIG. 7 and illustrates how a primary conduit means can be removed from its secondary conduit means.
Figure 8:
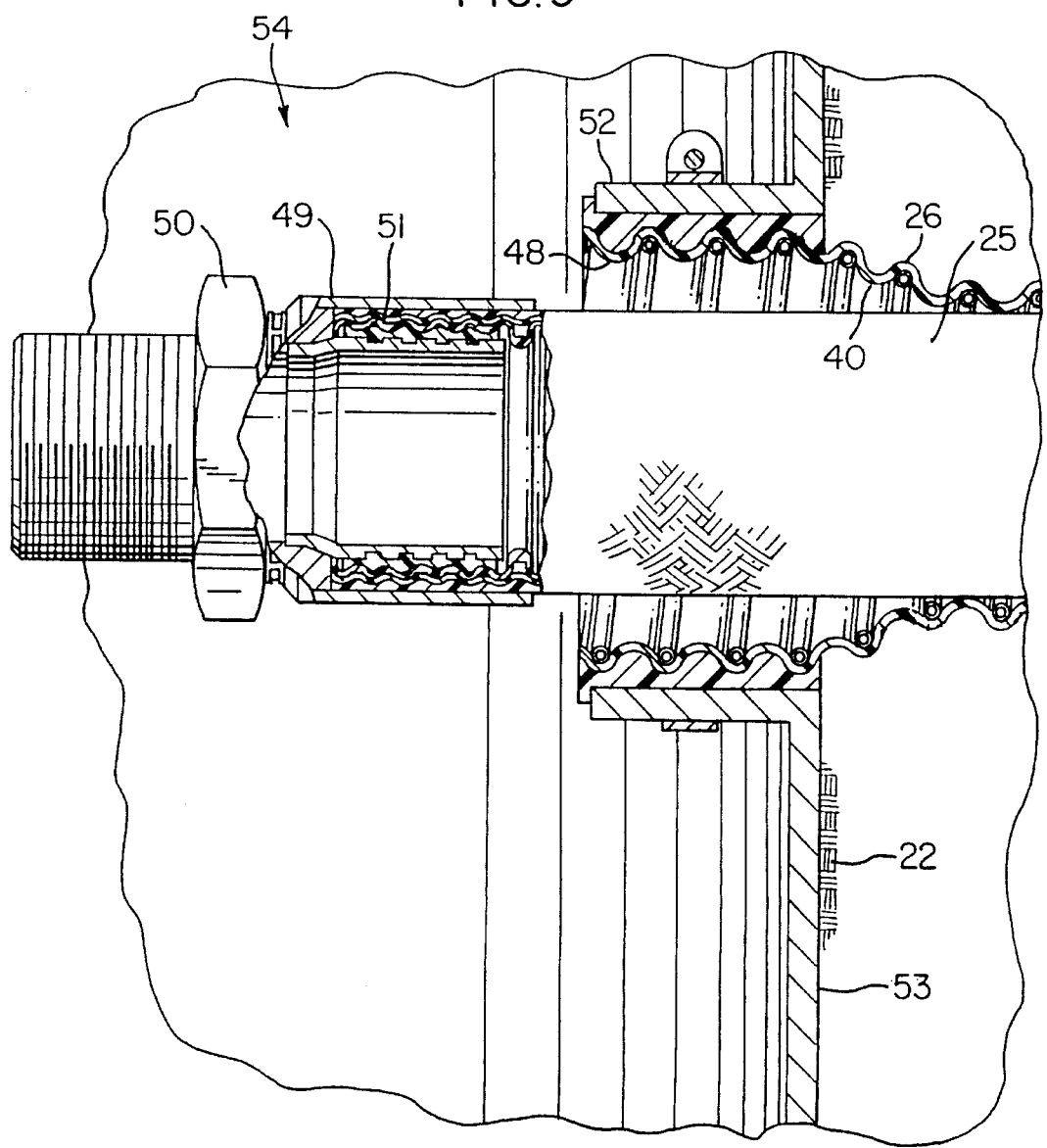
FIG. 8 is an enlarged fragmentary view of a portion of the system of FIG. 7.

As illustrated in FIGS. 7 and 9, the secondary conduit means 26 of each combination 21 has like opposite ends 48 and the respective primary conduit means 25 for the arrangement 21 has like opposite ends 49 which respectively extend outboard of the ends 48 of the secondary conduit means 26 as illustrated in the drawings and each comprises a coupling means 50 best illustrated in FIG. 8 and being secured to an adjacent end 51 of the flexible hose structure of the primary conduit means 25 all in a manner fully disclosed and claimed in the aforementioned U.S. patent to Sanders et al, U.S. Pat. No. 5,129,686 whereby this U.S. patent is also being incorporated into this disclosure by this reference thereto.

In this manner, the opposite ends 48 of the secondary conduit means 26 of each conduit arrangement 21 can be secured in substantially a sealed manner as disclosed in the aforementioned U.S. patent to Webb et al, U.S. Pat. No. 4,971,477 in opening means 52 provided in appropriately spaced access chamber means 53 that are disposed in the ground 22 so that the opposite ends 49 of the primary conduit means 25 of the respective conduit arrangement 21 can be respectively disposed in chambers 54 defined by the access chamber means 53 to couple with suitable coupling structure, such as structure 55 or 56 illustrated in FIG. 7 wherein the structure 55 couples to the dispensing pump means 24 while the coupling structure 56 couples with an adjacent end 49 of another conduit arrangement 21 all for the purposes and reasons fully set forth in the aforementioned U.S. patent to Webb et al, U.S. Pat. No. 4,971,477 and the aforementioned U.S. patent to Foster, U.S. Pat. No. 5,102,012.

It is believed that the unique conduit arrangement 21 of this invention readily permits the primary conduit means 25 to be removed from and be replaced in its respective secondary conduit means 26 after the respective combination 21 has been disposed in its under-the-ground location in the system 20 as the primary conduit means 25 is sufficiently flexible so that the same can be removed out through a respective access chamber means 53 in the manner schematically illustrated in FIG. 9 and as fully described in the aforementioned U.S. patent to Webb et al, U.S. Pat. No. 4,971,477.

Figure 10:
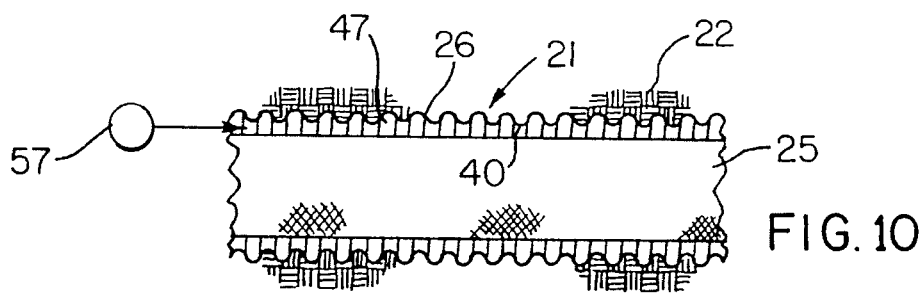
FIG. 10 is a schematic view of the system of this invention and illustrates how the primary conduit means can be removed from or be inserted within its secondary conduit means when the secondary conduit means is in its under-the-ground location thereof.

It may be found that to facilitate such removal and such insertion, a suitable fluid, such as air under pressure, can be directed into the helically disposed passage 47 of the respective conduit arrangement 21 as represented by the pumping source 57 in FIG. 10 to tend to outwardly expand the secondary conduit means 26 away from its engagement with the primary conduit means 25 as schematically illustrated in FIG. 10.

Figure 11:
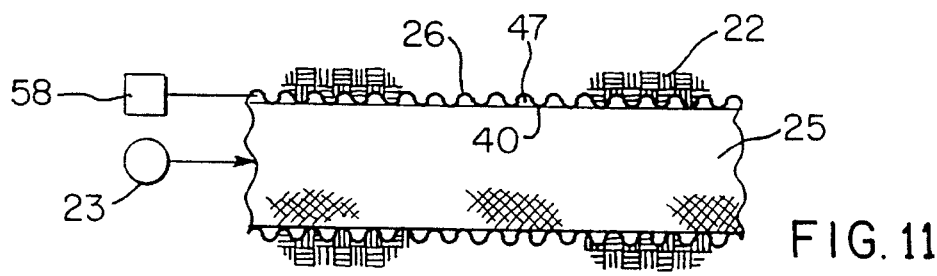
FIG. 11 is a view similar to FIG. 10 and illustrates how the desired fluid is to be conveyed through the primary conduit means and how the unique passage means that is created between the secondary conduit means and the primary conduit means can be utilized for detecting for leakage of that fluid through the outer peripheral surface means of the primary conduit means.

Also, as previously stated, the primary conduit means 25 could have such a dimension that the same is normally out of complete spiral contact with the projection means 40 of the secondary conduit means 26 in the manner illustrated in FIG. 10 until the fluid being directed therein from the under-the-ground storage tank means 23 is pumped therethrough under pressure in the manner illustrated in FIG. 11 so that when the source 23 is removed from the primary conduit means 25 in the manner illustrated in FIG. 10, the primary conduit means 25 will shrink away from the secondary conduit means 26 and/or in combination with the pump means 57 to produce an arrangement wherein the primary conduit means 25 can be readily removed from the secondary conduit means 26 and a new primary conduit means 25 reinserted therein as previously set forth.

Also, while the coupling means 49 illustrated in FIG. 8 appears to be relatively large, it is to be understood that the same could have the various parts thereof so dimensioned that the same readily permits the entire primary conduit means 25 with its coupling means 49 to be removed therewith from its secondary conduit means 26 or inserted therewith as the case may be. Of course, it is to be understood that the couplings 49 could be cut off before a primary conduit means 25 is removed, as desired.

In any event, it can be seen that in the combination 21 of this inventions, the secondary conduit means 26 not only protects against any fluid leakage from the primary conduit means 25 from reaching the ground 22, but also through the engagement of the inner projection means 40 thereof, the secondary conduit means 26 provides reinforcement to the primary conduit means 25 in maintaining its fluid conveying function.

In addition, it is believed that the helically disposed passage 47 of the conduit arrangement 21 can be utilized for leak detection purposes so as to determine whether any leakage of the fluid from within the primary conduit means 25 has permeated through any part of the external peripheral surface means 28 thereof and thereby reached the space 47 between the conduit means 25 and 26. For example, it is believed that a suitable leak detecting means 58, FIG. 11, can be so interconnected to the passage means 47 of each conduit arrangement 21 that the leak detecting means 58 can detect for any leakage of fluid from the primary conduit means 25 to the space 47 between the conduit means 25 and 26, the leak detecting means 58 comprising a pressure transducer, a gas sampling device, etc. Alternately or in lieu thereof the passage 47 could be utilized to carry a fiber optic means throughout the length of the passage 47 and be interconnected to the detector 58 for detecting for fluid leakage or the passage means 47 can be utilized for having a conductor (with or without a fluid dissolvable sheath thereon) disposed therein which would indicate to the device 58 that leakage has occurred in a manner similar to the electrical leak detection means of the aforementioned U.S. patent to Foster, U.S. Pat. No. 5,102,012. In fact, the reinforcement 44 of the secondary conduit means 26 could comprise a conductor for such leak detection purpose in addition to its reinforcement purpose.

In any event, it can be seen that the secondary conduit means 26 of each conduit arrangement 21 of this invention not only has the benefit of a secondary conduit means as set forth in the aforementioned U.S. patent to Webb et al, U.S. Pat. No. 4,971,477 and the U.S. patent to Foster, U.S. Pat. No. 5,102,012 for its secondary containment purpose, but also the secondary conduit means 26 of this invention provides a reinforcement function for the primary conduit means 25 and/or a leak detection function through the unique helically disposed passage means 47 thereof.

Likewise, if the primary conduit means 25 has the helically disposed passage 34A therein as provided by the conduit arrangement 21A previously described, such helically disposed passage 34A could also be utilized for leak detection purposes in a manner similar to the passage 47 to detect for leakage in the primary conduit means 25A before such leakage reaches the passage 47 between the conduit means 25A and 26A.

While various parts have been previously illustrated and described for the system 20 of this invention, it is to be understood that other parts can be utilized. For example, the coupling for the outer ends 48 of the secondary conduit means 26 could each comprise a clamshell type of coupling whereby separate (or joined on one edge) parts are folded over the hose 26 and affixed together at their edges. Alternately, this coupling could also be spud glued to the primary conduit means 25 with a receptacle receiving the outer secondary conduit means 26 therein.

In any event, it can be seen that it is a relatively simple method of this invention to make the system 20 of this invention to function in the manner previously set forth.

Thus, this invention not only provides a new system for conveying a fluid through an under-the-ground location, but also this invention provides a new method of making such a system or the like.

While the forms and methods of this invention now preferred have been illustrated and described as required by the Patent Statute, it is to be understood that other forms and method steps can be utilized and still fall within the scope of the appended claims wherein each claim sets forth what is believed to be known an each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. In a system for conveying a fluid through an under-the-ground location, said system comprising a primary flexible conduit means for conveying said fluid therethrough and having an inner peripheral surface and an outer substantially smooth surface, and an outer secondary conduit formed mainly of polymeric material having at least a portion of said primary conduit means removably disposed therein and having an inner peripheral surface and an outer peripheral surface that engages said ground in said under-the-ground location thereof; the improvement wherein said secondary conduit has a part of said inner peripheral surface thereof comprising inwardly directed wire reinforced projections thereof engaging the entire extent of said substantially smooth outer peripheral surface of said primary conduit means, said inwardly directed projections defining recesses to define a passage between said primary and said secondary conduit that extends therebetween throughout substantially the entire engagement area thereof so as to facilitate removal of said primary conduit means while said secondary conduit remains in said under-the-ground location thereof.

2. A system as set forth in claim 1 wherein said primary conduit means comprises a flexible hose formed mainly of polymeric material.

3. A system as set forth in claim 1 wherein said secondary conduit has opposite ends, said primary conduit means having opposite ends one of which extends beyond one of said opposite ends of said secondary conduit.

4. A system as set forth in claim 3 wherein said system comprises an access chamber disposed in said ground and having opening, said primary conduit means having a portion thereof disposed in said opening with said one of said opposite ends thereof disposed in said access chamber.

5. A system as set forth in claim 4 wherein said one of said opposite ends of said secondary conduit is disposed in said opening and is secured to said access chamber.

6. A system as set forth in claim 1 wherein said system comprises leak detection means operatively interconnected to said conduit means to detect for leakage of said fluid from said primary conduit means through said outer peripheral surface thereof.

7. A system as set forth in claim 6 wherein said leak detection means is operatively interconnected between said fluid conveying area of said primary conduit means and said passage.

8. A system as set forth in claim 1 wherein said primary conduit means has a helically disposed passage therein that extends throughout the length thereof.

9. In a method of making a system for conveying a fluid through an under-the-ground location, said method comprising the steps of forming a primary flexible conduit means for conveying said fluid therethrough and a secondary conduit means mainly of polymeric material for containing at least part of said primary conduit means therein with each said conduit means having an inner peripheral surface and an outer peripheral surface, forming said outer peripheral surface of said primary conduit means to have a substantially smooth surface, and disposing said system in said ground at said under-the ground location so that said ground engages said outer peripheral surface of said secondary conduit means and said at least part of said primary conduit means is removably disposed within said secondary conduit means; the improvement comprising the steps of forming said inner peripheral surface of said secondary conduit means to have a part thereof that comprises inwardly directed projections thereof engaging the entire extent of said substantially smooth outer peripheral surface of said primary conduit means said inwardly directed projections defining recesses to define a passage between said primary and said secondary conduits that extends therebetween through substantially the entire engagement area thereof so as to facilitate removal of said primary conduit means from said secondary conduit means while said secondary conduit means remain in said under-the-ground location thereof.

10. A method as set forth in claim 9 and including the step of forming said primary conduit means to comprise a flexible hose formed mainly of polymeric material.

11. A method as set forth in claim 9 and including the steps of forming said secondary conduit means to have opposite ends, and forming said primary conduit means to have opposite ends one of which extends beyond one of said opposite ends of said secondary conduit means.

12. A method as set forth in claim 11 and including the steps of forming said system to comprise an access chamber disposed in said ground and having opening, and forming said primary conduit means to have a portion thereof disposed in said opening with said one of said opposite ends thereof disposed in said access chamber.

13. A method as set forth in claim 12 and including the steps of disposing said one of said opposite ends of said secondary conduit means in said opening, and securing said one of said opposite ends of said secondary conduit means to said access chamber.

14. A method as set forth in claim 9 and including the step of forming said system to comprise leak detection means operatively interconnected to said conduit means to detect for leakage of said fluid from said primary conduit means through said outer peripheral surface thereof.

15. A method as set forth in claim 14 including the step of operatively interconnecting said leak detection means between said fluid conveying area of said primary conduit means and said passage.

16. A method as set forth in claim 9 and including the step of forming said primary conduit means to have a helically disposed passage therein that extends throughout the length thereof.

* * * * *